April 20, 1965   C. A. MOUSSEAU   3,178,847
LIVE-BAIT CASTING DEVICE WITH POSITIVE BAIT EJECTION
Filed May 8, 1963   3 Sheets-Sheet 1
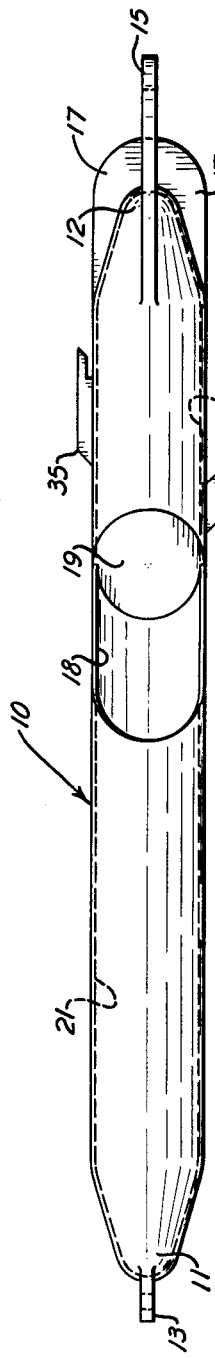
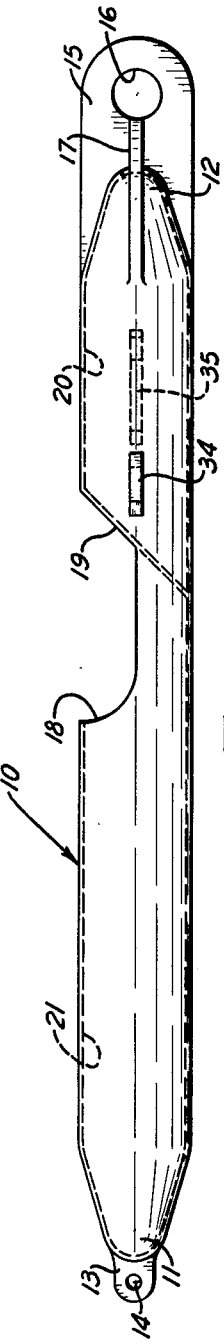
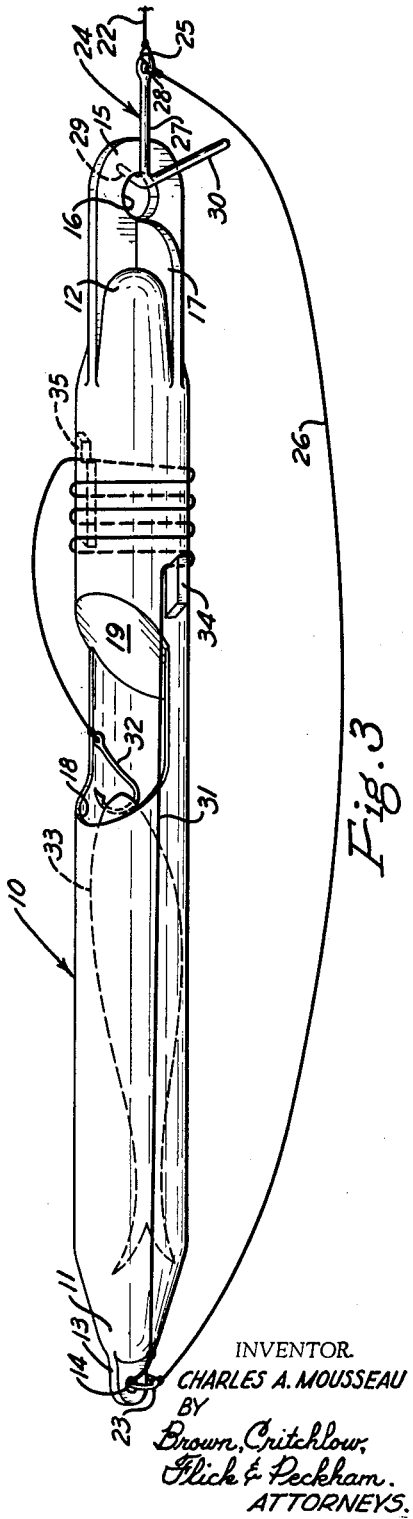
INVENTOR.
CHARLES A. MOUSSEAU
BY
Brown, Critchlow,
Flick & Peckham.
ATTORNEYS.

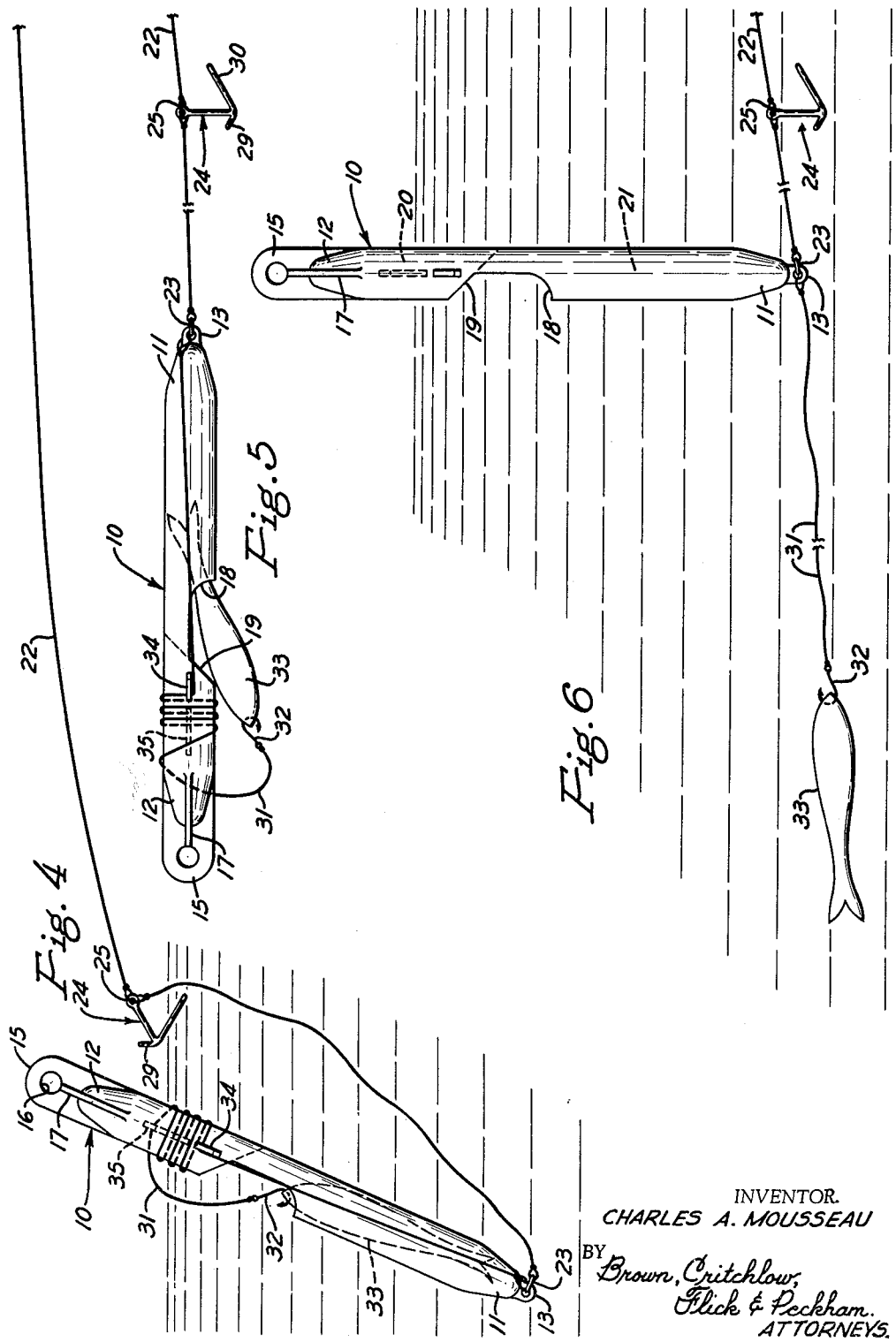

April 20, 1965  C. A. MOUSSEAU  3,178,847
LIVE-BAIT CASTING DEVICE WITH POSITIVE BAIT EJECTION
Filed May 8, 1963  3 Sheets-Sheet 3
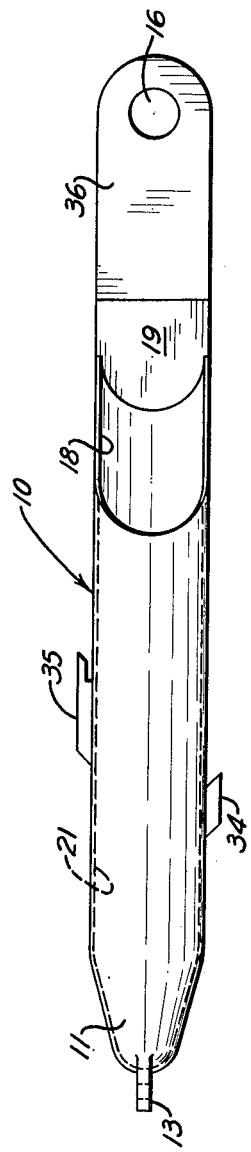
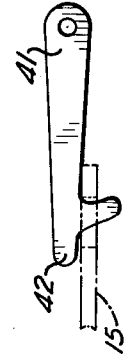
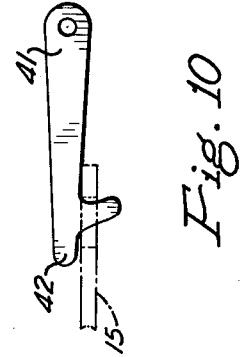
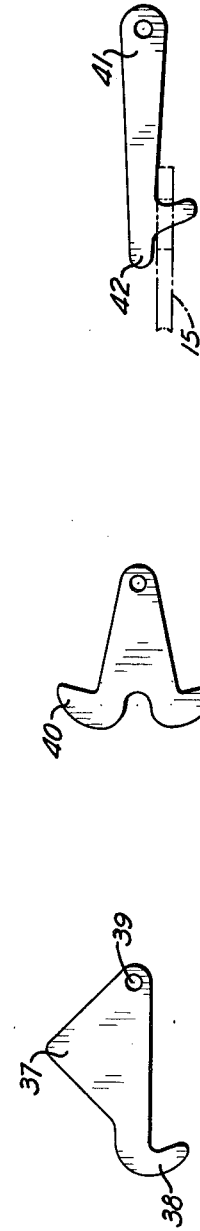
INVENTOR.
CHARLES A. MOUSSEAU
BY
Brown, Critchlow, Flick & Peckham.
ATTORNEYS.

3,178,847
LIVE-BAIT CASTING DEVICE WITH POSITIVE BAIT EJECTION

Charles A. Mousseau, Pittsburgh, Pa., assignor to Robert A. Mousseau and Thomas Earl Mousseau
Filed May 8, 1963, Ser. No. 278,832
7 Claims. (Cl. 43—41.2)

This invention relates to a device which permits the casting of live bait without injury to the bait, and which also provides for positive ejection of the live bait after the device hits the water.

It is well known to fishermen that it is often desirable to cast a live bait such as a minnow, for a considerable distance over the water. When this is done, the bait hits the water with considerable force, and if the bait is unprotected, the force of the impact is often sufficient to stun or kill the bait. It is desirable to have the bait arrive at the intended fishing spot alive and in good health so that it will be able to swim about in its usual lively fashion.

The desirability of this broad objective has been recognized in the past, and various attempts have been made to meet it. But these attempts have either involved the use of reversible floats which depend on gravity to unload the bait, or have involved other features which have made them impractical.

According to the principles of the present invention, during the casting operation the live bait is permitted to float in a body of water contained in a reversible capsule. The casting line is permanently connected to the end of the capsule which is the front end during the flight of the capsule through the air. At the end of the capsule which is the rear end during flight, the casting line is attached by a detachable connection. This connection permits the fisherman to use his rod to whip the capsule into its intended flight. However, when the capsule hits the water, the detachable connection automatically disconnects, leaving the casting line attached to the front end of the capsule.

The fisherman then gives a slight jerk on the line, causing the capsule to turn end-for-end, and positively ejecting the bait from the capsule. The bait is then in a healthy condition and is able to swim about free of all restraint except that provided by the bait line.

This arrangement provides for positive and automatic ejection of the live bait from the capsule after the capsule hits the water.

These, and other objects and advantages of the invention will become apparent as the description proceeds.

In the drawings:

FIG. 1 is a side elevation of the capsule.

FIG. 2 is a plan view of the capsule.

FIG. 3 is a side elevation showing the device ready for casting.

FIG. 4 is a view showing the device immediately after it has hit the water.

FIG. 5 is a view showing the device after it has been reversed end-for-end, and the bait is being ejected.

FIG. 6 shows the device in fishing position.

FIG. 7 is a view similar to FIG. 1 of a modified device.

FIGS. 8 to 10 inclusive are diagrammatic views showing modified forms of the detachable coupling.

Construction

Referring to the drawings in greater detail, FIG. 1 is a side elevation of the capsule 10, which is the main element of the device. This capsule is an elongated tubular member, preferably formed of transparent plastic, or some other lightweight, waterproof material.

The opposite ends 11 and 12 are tapered to form nose cones that reduce resistance when the capsule is traveling through air or water. The front nose cone 11 carries a tab or projection 13 formed with an aperture 14, or other formation, for attaching the casting line and the bait line.

The rear nose cone 12 carries a vertical stabilizing fin 15, which is formed with an opening 16 for attachment of the detachable connection to be explained later. The rear nose cone 12 may also carry a horizontal stabilizing fin 17. It will be understood that the stabilizing fins 15 and 17 help to maintain the capsule on a straight-line flight when it is cast.

An escape opening 18 is formed in the wall of the capsule, approximately ⅓ of the distance forward from the rear nose cone 12. This escape opening is large enough to permit the ready insertion or escape of the live bait.

An inclined bulkhead 19 forms a wall at the rear end of the escape opening. This bulkhead 19 extends across the entire inner diameter of the capsule 10, and has its edges sealed against the inner wall of the capsule to seal off the portion of the capsule between the bulkhead 19 and the nose cone 12. This airtight chamber 20 forms a float or bobbin after the capsule has arrived at the intended spot for fishing. The opposite end of the capsule forms the bait compartment 21.

It will be clear from FIG. 1 that the upper end of bulkhead 19 is tilted toward the rear nose cone 12, at an angle of approximately 45°. This angular arrangement of the bulkhead facilitates ejection of the bait, as will be explained later.

In use, the fishing line 22 is attached in any preferred manner, as by the metal ring 23 to the aperture 14 in the tab 13 on the front nose cone 11 (FIG. 3). A detachable hook 24 is connected to line 22 at such a point 25 that when the parts are in the position of FIG. 3 there is some slack forming a bight 26 around the capsule.

The detachable hook 24 may be made in different forms, a preferred form being shown in FIGS. 1 to 6 inclusive. In this form the hook includes a stem 27 formed at one end with an eyelet 28 for line attachment. The opposite end of the stem carries a short fluke 29, which serves as a hook for engagement in the aperture 16 of the rear nose cone 12, and a longer fluke 30, which acts as a counterweight to cause disengagement of the hook in a manner to be presently described.

A short bait line 31 is attached at one end to the aperture 14, and carries at its other end the usual fishhook 32. The length of the line 31 can be adjusted as desired, to limit the range of the bait when it is swimming free.

Preparation for cast

When the fisherman wishes to make a cast, he first attaches the fishhook 32 to the minnow 33 in the usual way. The bait line 31 is then made fast about the capsule in the following manner.

The line 31 is drawn close along the outside of the capsule from the aperture 14 to a line snubber 34 attached to the outside of the capsule near the rear end. This snubber 34 can be any projection having a slightly undercut lip that will snub the line while it is being wound around the outside of the capsule.

The line 31 is then wound around the outside of the capsule until most of this line has been taken up, leaving just a little slack. The line is then passed under the end of the line-clasping lug 35. This lug 35 is a lug extending along the side opposite from the snubber 34, and having its rear end spaced from the wall of the capsule a slight distance to form a notch pointing toward the rear end of the capsule and narrow enough to releasably hold the line (see FIG. 2).

It will be understood that the snubber 34 and the line-clasping lug 35 may be detents of any suitable form to accomplish their intended purpose.

The minnow 33 is then placed tail-down in the bait compartment of the capsule. The capsule is now held in a vertical position with the rear cone 12 uppermost. The fisherman can now dip the capsule vertically into the water, permitting water to fill the bait compartment 21, and thus provide a body of water surrounding and supporting the minnow, and providing a supply of oxygen for the minnow.

The fluke 29 of the hook 22 is then enagaged in the aperture 16. The loaded capsule is then suspended vertically by the fish line, and the fisherman reels in the line until the capsule is the desired distance (say about 30 inches) from the tip of the rod. Due to the arrangement of aperture 16 on the central axis, the capsule will hang in a straight vertical line.

The cast is now made in the usual manner, using a casting rod. During the casting the parts are in the position of FIG. 3. The hook 24 maintains its engagement with the capsule, because the momentum of the loaded capsule tends to maintain a forward force against the hook 24. The capsule therefore flies through the air with the front cone 11 forward, and with the fins on the rear cone 12 exerting a stabilizing influence so as to keep the capsule straight on its intended line of flight. The line-clasping lug 35 keeps the bait line from unwinding while the capsule is in flight. The fact that the minnow is heavier than the capsule keeps the minnow in the bait chamber due to inertia.

As soon as the front end of the capsule strikes the water, the forward motion of the capsule is checked, and the hook 24 automatically becomes disengaged from the aperture, due to the release of the tension on the short fluke 29, and the leaverage action of the longer fluke 30. The parts are now in the position of FIG. 4.

Positive ejection of bait

The fisherman now gives a sharp jerk on the line 22, and since this line is now connected only to the forward end of the capsule, the capsule is turned end-for-end, and due to its weight, the minnow is positively ejected from the bait compartment. The fact that the bulkhead 19 slopes outwardly facilitates the ejection of the minnow, as shown in FIG. 5.

The pull on the line 22 is continued until all of the bait line 31 has become unwound. At this time the sealed chamber 20 gives the capsule enough buoyancy that it rises to the surface, acting as a vertical bobbin, as shown in FIG. 6.

The minnow is now free except for the bait line 31, and because it was fully protected during the casting operation, it will now swim about in a lively fashion to attract fish.

When the capsule is being retrieved, it can be reeled in with little resistance, since it does not bail water, and the rear nose cone 12 is now in the forward position.

Advantages

It will be clear to those skilled in the fishing art that this bait casting device has a number of advantages.

(1) It enables a fisherman to make a long cast of a live bait without injury to the bait.

(2) It provides for a positive ejection of the bait from the capsule, under control of the fisherman.

(3) The provision of nose cones on both ends of the capsule, permits the capsule to fly smoothly through the air during casting, and reduces water resistance when the capsule is being retrieved.

Another form

In deep water fishing, where a bobbin is not normally used, the sealed chamber 20 may be omitted. In this form, as shown in FIG. 7, the inclined bulkhead 19 may form the rearward end of the capsule, and the attaching tab 36 may be a continuation of the bulkhead 19.

With this form the entire capsule will sink to a low level in the water, and the minnow will circle about the capsule.

Detachable couplings

As indicated above, the purpose of the detachable hook 24 is to provide a temporary attachment that will keep the rear end of the capsule attached to the line during casting, but which will automatically release when the capsule strikes the water. Any detachable coupling that will serve this purpose can be used.

The hook 24 illustrated in FIGS. 1 to 6 is a preferred form because it is light in weight, and is least noticeable in the water.

Another form is illustrated in FIG. 8. In this case the main portion of the hook is a triangle-shaped body 37 which carries a hook 38 on one corner, and is formed with an aperture 39 in another corner. The projecting corner of the triangle provides a weight for release leverage, while the smooth sides resist snaring in weeds and other obstructions.

FIG. 9 illustrates an anchor-like form with two heavy hooks 40 of identical size. This double hook arrangement makes possible quick mounting, and the hook is stronger than that illustrated in FIGS. 1 to 6.

In FIG. 10 the long heavy stem 41 gives the counterweight for quick release, while the projecting nose 42 helps disengage the hook.

It will be seen that in each form, the hook has a projecting portion, such as the fluke 30, or the extensions 37, 40 or 42. These projecting portions prevent the hook from falling entirely through the opening 16. In this manner the special hooks ensure that proper disengagement takes place every time a cast is made.

Variations in structure

As stated above, the capsule is preferably made from clear plastic, since that material is light in weight and permits visual inspection of the live bait. It should be molded in as few parts as possible in order to provide economy of manufacture.

However, the capsule can be made of any other suitable material, such as light-weight metal.

The capsule can be made in a variety of sizes, depending on the type of fishing and the size of minnow to be used. In fishing for trout, a minnow about 1½ inches long is used, and for a minnow of this size the capsule should be about ½ inch in diameter, and of a suitable length. For the largest fish, such as muskelunge, the minnow should be 8 to 10 inches long, and the capsule should be about 2 inches in diameter.

The form specifically described and illustrated is designed particularly for casting live minnows, but the invention can also be used for live bait such as frogs or crabs. In such cases the capsule is made in flattened or oval cross section in order to accommodate the shape of these forms of bait.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A live bait casting device of the type which provides a shield for the live bait while it is being cast, the improvement which comprises:
   (A) an elongated capsule which has,
      (1) a closed end which is the front end when the the capsule is cast, and
      (2) a bait compartment beginning at the closed end of the capsule and extending a sufficient distance toward the rear end to accommodate a live bait, (3) the bait compartment having an escape opening spaced from the closed end of the capsule a distance approximately equal to the length of the bait accommodated;
(B) a casting line having an end securely fastened to the front end of the capsule;
(C) an automatically detachable coupling connecting an intermediate point of the casting line to the rear of the capsule and adapted
  (1) to form an effective coupling of the casting line with the rear end of the capsule during the casting,
  (2) and to become detached when the capsule strikes the water;
(D) and a bait line having one end securely fastened to the front end of the capsule, and carrying a fishhook at its free end and having sufficient slack,
(E) whereby, when the capsule strikes the water, the detachable coupling frees the casting line from the rear end of the capsule, and the capsule can then be reversed end-for-end under influence of the casting line to positively eject the bait from the capsule.

2. A device as described in claim 1 in which the capsule is formed of light-weight material.

3. A device as described in claim 1 in which the rear end of the capsule is formed with an air-tight float chamber.

4. A device as described in claim 1 in which the outside of the capsule carries detents which releasably hold the bait line in an arrangement wound around the outside of the capsule during the casting operation.

5. A device as described in claim 1 in which the detachable connection comprises a connector which has a hook portion which engages in an aperture formed in the rear end of the capsule, the connector having a weighted portion which causes the hook to become disengaged when tension on the hook is relaxed.

6. A device as claimed in claim 1 in which both ends of the capsule have the shape of tapered nose cones to reduce resistance when the capsule is traveling through air or water.

7. A device as claimed in claim 1 in which the rear nose cone is provided with vertical and horizontal stabilizing fins.

References Cited by the Examiner

UNITED STATES PATENTS

| | | | |
|---|---|---|---|
| 1,915,208 | 6/33 | Walthus | 43—43.11 |
| 2,475,736 | 7/49 | Burrows | 43—41.2 |
| 2,490,460 | 12/49 | McAvoy | 43—44.97 |
| 2,629,198 | 2/53 | Johnston | 43—41.2 |

ABRAHAM G. STONE, *Primary Examiner.*

MELVIN D. REIN, *Examiner.*